United States Patent [19]

Kamiyama et al.

[11] Patent Number: 5,280,578
[45] Date of Patent: Jan. 18, 1994

[54] COLOR IMAGE INFORMATION PROCESSING APPARATUS CAPABLE OF HIGH-SPEED PROCESSING IMAGE INFORMATION IN DIFFERENT FORM

[75] Inventors: Tadanobu Kamiyama, Yokosuka; Masami Taoda, Yokohama, both of Japan

[73] Assignee: Kabushiki Kaisha Toshiba, Kawasaki, Japan

[21] Appl. No.: 797,903

[22] Filed: Nov. 26, 1991

[30] Foreign Application Priority Data

Nov. 30, 1990 [JP] Japan ................... 2-340423

[51] Int. Cl.⁵ ............................................. G06F 15/20
[52] U.S. Cl. ................................... 395/164; 395/162; 395/148; 358/448; 345/187; 345/201
[58] Field of Search .................... 395/162–164, 600, 148, 131; 358/444, 445, 448, 451, 460; 340/724, 700, 744, 703, 798–800

[56] References Cited

U.S. PATENT DOCUMENTS

| | | | |
|---|---|---|---|
| 4,779,223 | 10/1988 | Asai et al. | 340/789 |
| 4,797,809 | 1/1989 | Sato et al. | 340/724 |
| 4,942,479 | 7/1990 | Kanno | 358/444 |
| 4,965,750 | 10/1990 | Matsuo et al. | 395/166 |
| 5,119,491 | 6/1992 | Iwai et al. | 395/600 |
| 5,133,025 | 7/1992 | Koyama et al. | 358/451 |

FOREIGN PATENT DOCUMENTS 0249948 12/1987 European Pat. Off.
0361739 4/1990 European Pat. Off.

*Primary Examiner*—Dale M. Shaw
*Assistant Examiner*—Kee M. Tung
*Attorney, Agent, or Firm*—Cushman, Darby & Cushman

[57] ABSTRACT

When image information is to be transferred between processing units having different image information forms, e.g., the pixel width and plane width of image information, the image information is converted by a reformatting unit using the form attribute information of a transfer source and that of a transfer destination. With this operation, a long processing time is not required to transfer image information between arbitrary processing units having different image information forms, e.g., the pixel width and plane width of image information, and there is no need to impose limitations on the types of forms which can be processed on one apparatus, thus enabling high-speed processing and realizing a flexible system.

7 Claims, 28 Drawing Sheets

PACKED PIXEL SCHEME

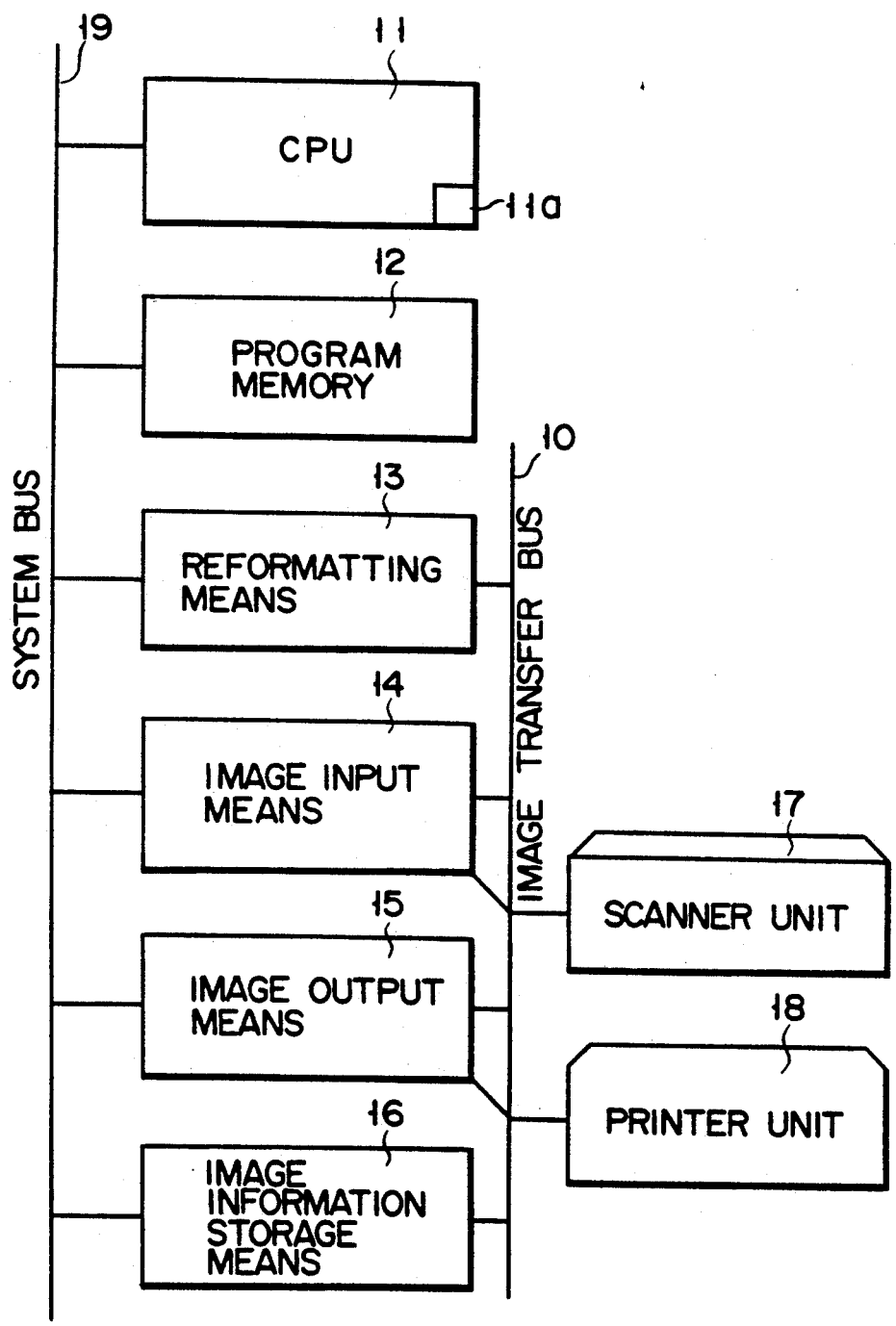
F I G. 2

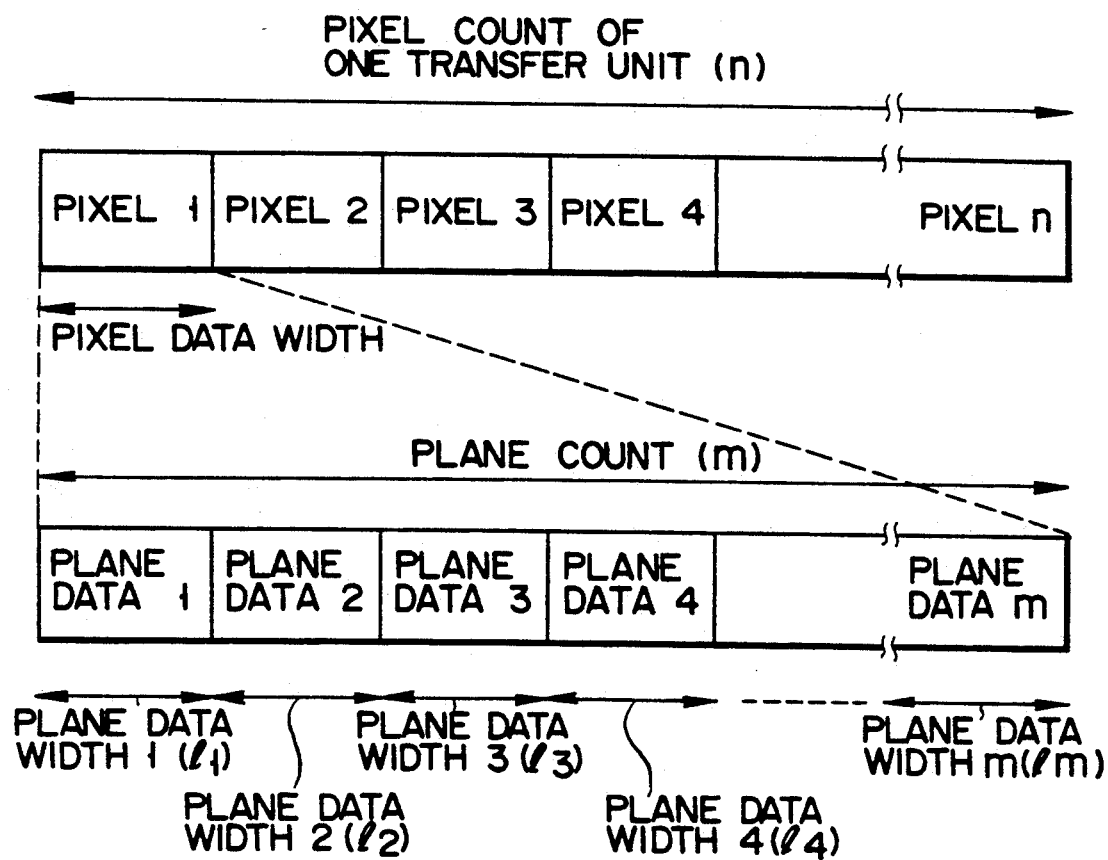
F I G. 3

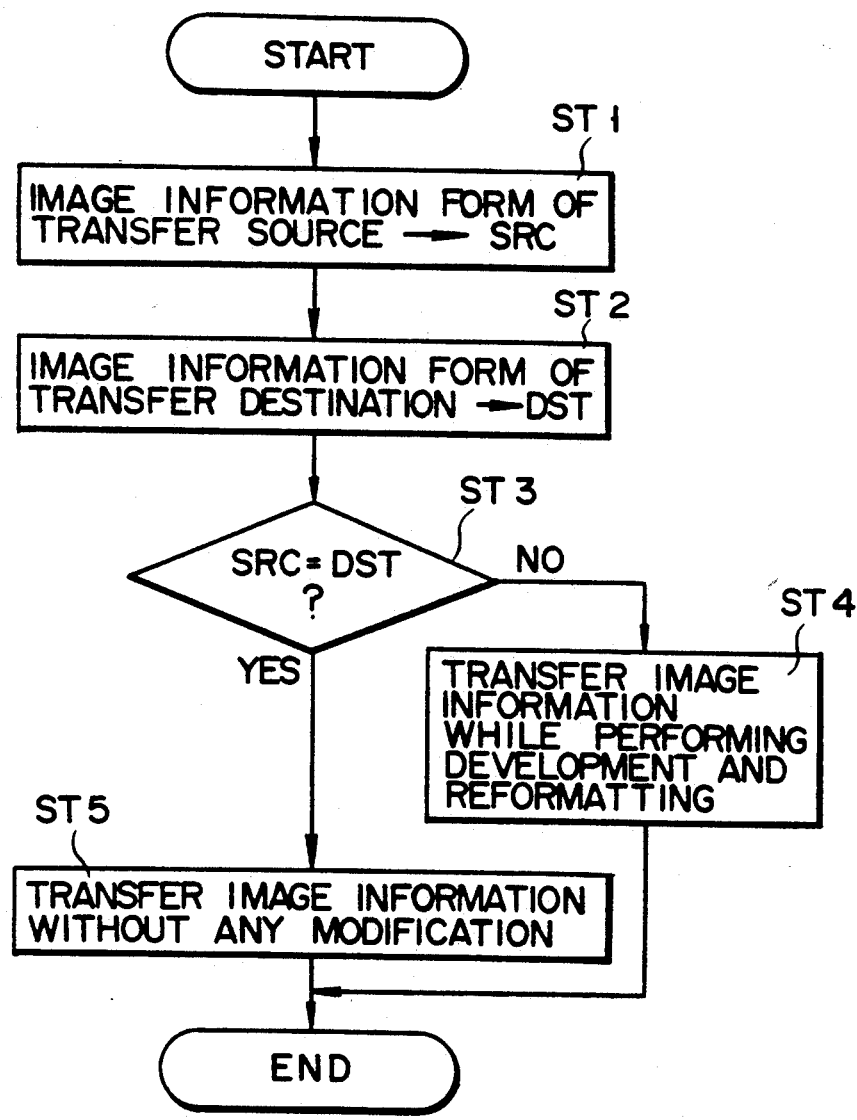
F I G. 4

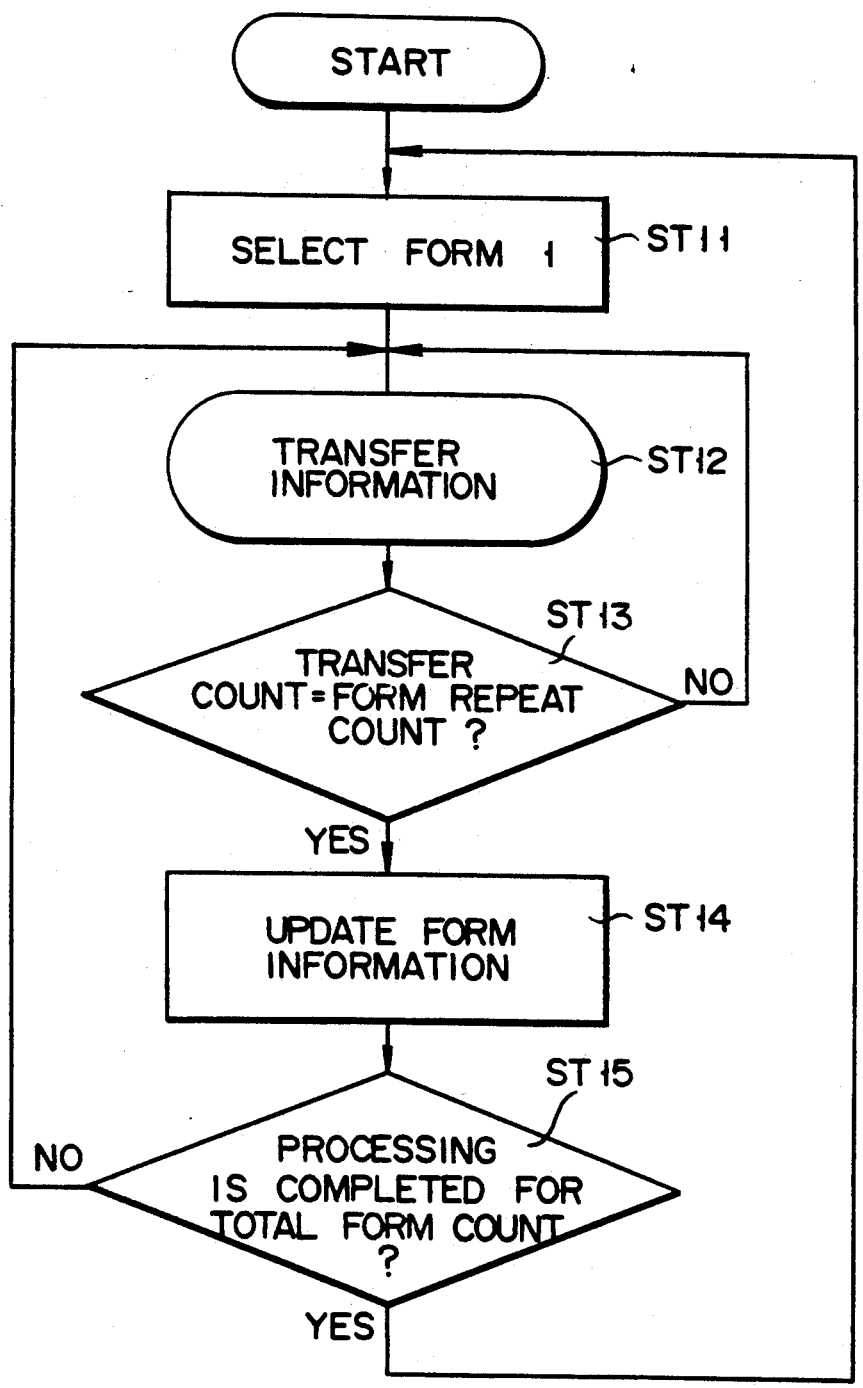
F I G. 9

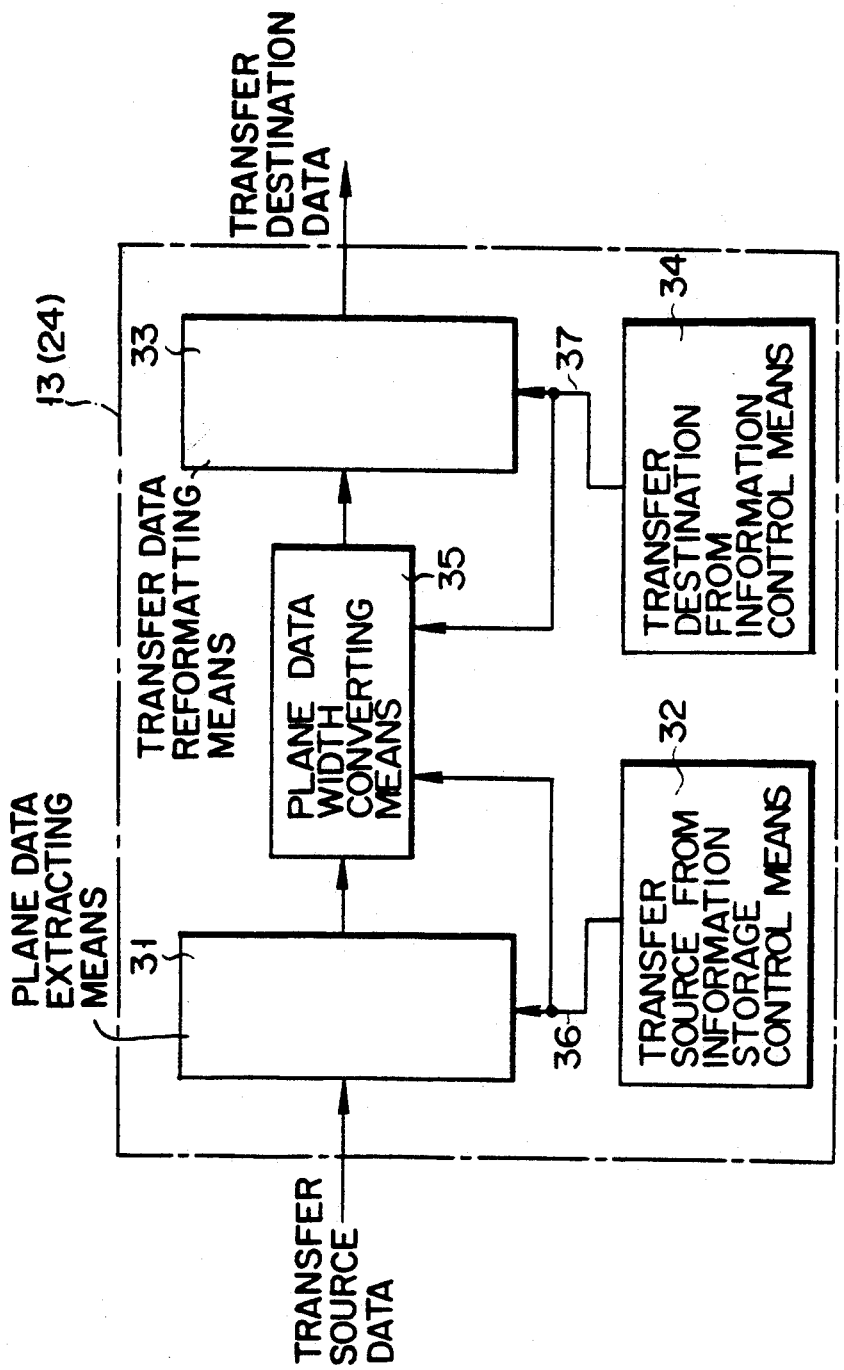
F I G. 10

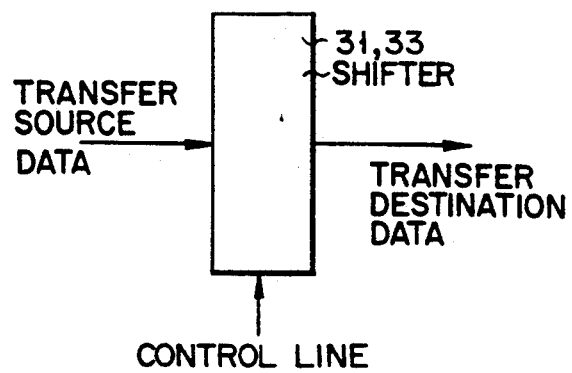
F I G. 14A
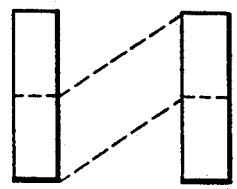
F I G. 14B
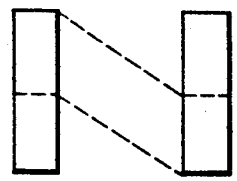
F I G. 14C
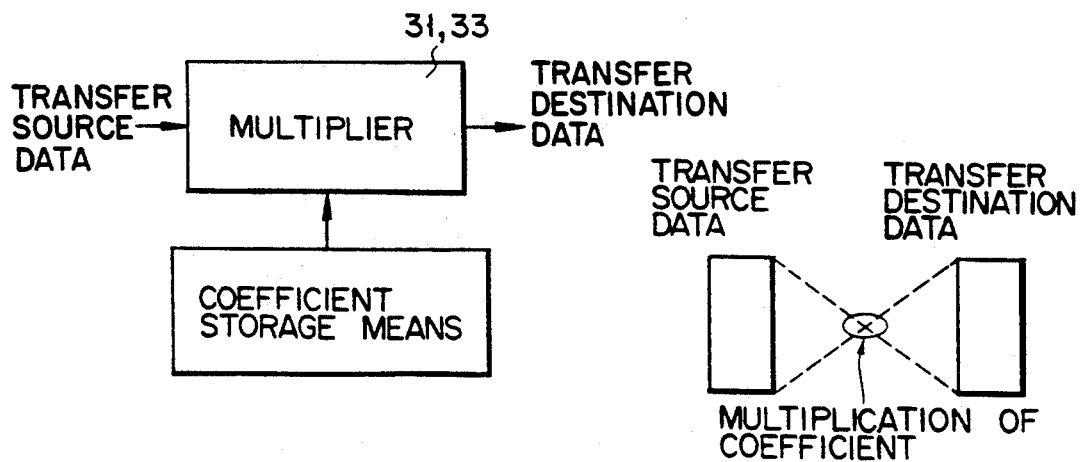
F I G. 15A   F I G. 15B

| | | TRANSFER SOURCE | TRANSFER DESTINATION |
|---|---|---|---|
| | FORM COUNT | 1 | 1 |
| FORM 1 | FORM REPEAT COUNT | — | — |
| | PIXEL COUNT | 4 | 1 |
| | PIXEL DATA WIDTH | 4 | 4 |
| | PLANE COUNT | 1 | 1 |
| | DATA POSITION OF PLANE 1 | 0 | 0 |
| | DATA WIDTH OF PLANE 1 | 4 | 4 |
| | DATA POSITION OF PLANE 2 | | |
| | DATA WIDTH OF PLANE 2 | | |
| | DATA POSITION OF PLANE 3 | | |
| | DATA WIDTH OF PLANE 3 | | |
—: ARBITRARY
F I G. 18A
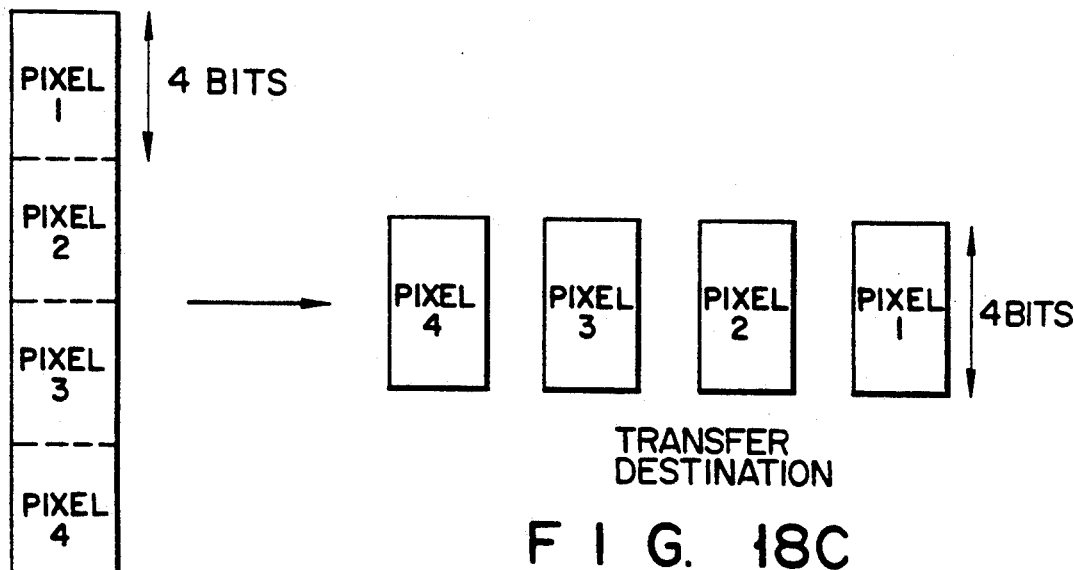
F I G. 18C
F I G. 18B

| | | TRANSFER SOURCE | TRANSFER DESTINATION |
|---|---|---|---|
| FORM COUNT | | 1 | 1 |
| FORM 1 | FORM REPEAT COUNT | — | — |
| | PIXEL COUNT | 1 | 1 |
| | PIXEL DATA WIDTH | 11 | 4 |
| | PLANE COUNT | 3 | 1 |
| | DATA POSITION OF PLANE 1 | 0 | 0 |
| | DATA WIDTH OF PLANE 1 | 4 | 4 |
| | DATA POSITION OF PLANE 2 | 4 | |
| | DATA WIDTH OF PLANE 2 | 3 | |
| | DATA POSITION OF PLANE 3 | 7 | |
| | DATA WIDTH OF PLANE 3 | 4 | |
F I G. 19A
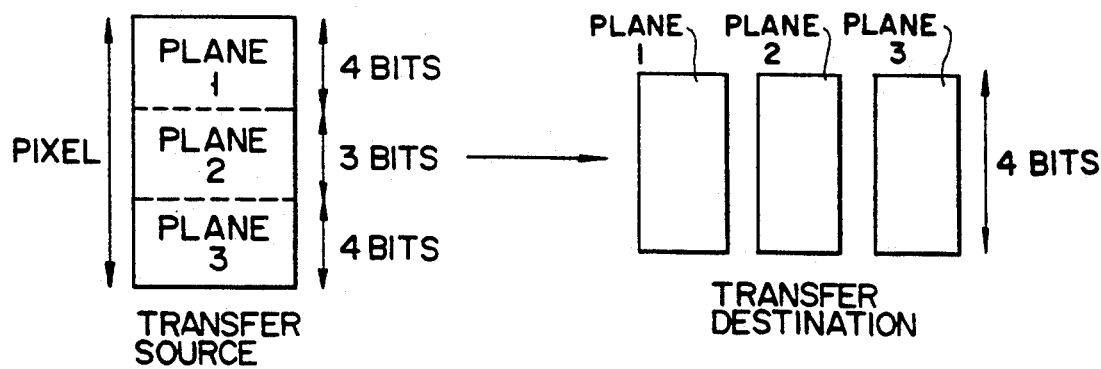
F I G. 19B            F I G. 19C

|  | | TRANSFER SOURCE | TRANSFER DESTINATION |
|---|---|---|---|
| FORM COUNT | | 1 | 3 |
| FORM 1 | FORM REPEAT COUNT | — | 1 |
| | PIXEL COUNT | 1 | 1 |
| | PIXEL DATA WIDTH | 11 | 12 |
| | PLANE COUNT | 3 | 1 |
| | DATA POSITION OF PLANE 1 | 0 | 0 |
| | DATA WIDTH OF PLANE 1 | 4 | 4 |
| | DATA POSITION OF PLANE 2 | 4 | |
| | DATA WIDTH OF PLANE 2 | 3 | |
| | DATA POSITION OF PLANE 3 | 7 | |
| | DATA WIDTH OF PLANE 3 | 4 | |
| FORM 2 | FORM REPEAT COUNT | | 1 |
| | PIXEL COUNT | | 1 |
| | PIXEL DATA WIDTH | | 12 |
| | PLANE COUNT | | 1 |
| | DATA POSITION OF PLANE 1 | | 4 |
| | DATA WIDTH OF PLANE 1 | | 4 |
| | DATA POSITION OF PLANE 2 | | |
| | DATA WIDTH OF PLANE 2 | | |
| | DATA POSITION OF PLANE 3 | | |
| | DATA WIDTH OF PLANE 3 | | |

FIG. 20A-I

| | | TRANSFER SOURCE | TRANSFER DESTINATION |
|---|---|---|---|
| FORM 3 | FORM REPEAT COUNT | | 1 |
| | PIXEL COUNT | | 1 |
| | PIXEL DATA WIDTH | | 12 |
| | PLANE COUNT | | 1 |
| | DATA POSITION OF PLANE 1 | | 8 |
| | DATA WIDTH OF PLANE 1 | | 4 |
| | DATA POSITION OF PLANE 2 | | |
| | DATA WIDTH OF PLANE 2 | | |
| | DATA POSITION OF PLANE 3 | | |
| | DATA WIDTH OF PLANE 3 | | |

F I G. 20A-II

|  | TRANSFER SOURCE | TRANSFER DESTINATION |
|---|---|---|
| FORM COUNTER | 1 | 3 |
| FORM 1 — FORM REPEAT COUNT | — | ONE-LINE TRANSFER COUNT |
| FORM 1 — PIXEL COUNT | 1 | 1 |
| FORM 1 — PIXEL DATA WIDTH | 4 | 12 |
| FORM 1 — PLANE COUNT | 1 | 1 |
| FORM 1 — DATA POSITION OF PLANE 1 | 0 | 0 |
| FORM 1 — DATA WIDTH OF PLANE 1 | 4 | 4 |
| FORM 1 — DATA POSITION OF PLANE 2 | | |
| FORM 1 — DATA WIDTH OF PLANE 2 | | |
| FORM 1 — DATA POSITION OF PLANE 3 | | |
| FORM 1 — DATA WIDTH OF PLANE 3 | | |

F I G. 21A-I

| | | TRANSFER SOURCE | TRANSFER DESTINATION |
|---|---|---|---|
| FORM 2 | FORM REPEAT COUNT | | ONE-LINE TRANSFER COUNT |
| | PIXEL COUNT | | 1 |
| | PIXEL DATA WIDTH | | 12 |
| | PLANE COUNT | | 1 |
| | DATA POSITION OF PLANE 1 | | 4 |
| | DATA WIDTH OF PLANE 1 | | 4 |
| | DATA POSITION OF PLANE 2 | | |
| | DATA WIDTH OF PLANE 2 | | |
| | DATA POSITION OF PLANE 3 | | |
| | DATA WIDTH OF PLANE 3 | | |

FIG. 21A-II

|  |  | TRANSFER SOURCE | TRANSFER DESTINATION |
|---|---|---|---|
| FORM 3 | FORM REPEAT COUNT |  | ONE-LINE TRANSFER COUNT |
|  | PIXEL COUNT |  | 1 |
|  | PIXEL DATA WIDTH |  | 12 |
|  | PLANE COUNT |  | 1 |
|  | DATA POSITION OF PLANE 1 |  | 8 |
|  | DATA WIDTH OF PLANE 1 |  | 4 |
|  | DATA POSITION OF PLANE 2 |  |  |
|  | DATA WIDTH OF PLANE 2 |  |  |
|  | DATA POSITION OF PLANE 3 |  |  |
|  | DATA WIDTH OF PLANE 3 |  |  |

FIG. 21A-III

UPDATE PROCESSING IS REPEATED IN UNITS OF LINES

TRANSFER SOURCE

TRANSFER DESTINATION

|  |  | TRANSFER SOURCE | TRANSFER DESTINATION |
|---|---|---|---|
|  | FORM COUNTER | 3 | 3 |
| FORM 1 | FORM REPEAT COUNT | TRANSFER COUNT/LINE | DITTO |
|  | PIXEL COUNT | 1 | 1 |
|  | PIXEL DATA WIDTH | 3 | 21 |
|  | PLANE COUNT | 1 | 1 |
|  | DATA POSITION OF PLANE 1 | 0 | 0 |
|  | DATA WIDTH OF PLANE 1 | 3 | 8 |
|  | DATA POSITION OF PLANE 2 | | |
|  | DATA WIDTH OF PLANE 2 | | |
|  | DATA POSITION OF PLANE 3 | | |
|  | DATA WIDTH OF PLANE 3 | | |

FIG. 22A-I

|  | | TRANSFER SOURCE | TRANSFER DESTINATION |
|---|---|---|---|
| FORM 2 | FORM REPEAT COUNT | TRANSFER COUNT/LINE | DITTO |
| | PIXEL COUNT | 1 | 1 |
| | PIXEL DATA WIDTH | 4 | 21 |
| | PLANE COUNT | 1 | 1 |
| | DATA POSITION OF PLANE 1 | 0 | 8 |
| | DATA WIDTH OF PLANE 1 | 4 | 7 |
| | DATA POSITION OF PLANE 2 | | |
| | DATA WIDTH OF PLANE 2 | | |
| | DATA POSITION OF PLANE 3 | | |
| | DATA WIDTH OF PLANE 3 | | |

FIG. 22A-II

|  | TRANSFER SOURCE | TRANSFER DESTINATION |
|---|---|---|
| FORM REPEAT COUNT | TRANSFER COUNT/LINE | DITTO |
| PIXEL COUNT | 1 | 1 |
| PIXEL DATA WIDTH | 5 | 21 |
| PLANE COUNT | 1 | 1 |
| DATA POSITION OF PLANE 1 | 0 | 15 |
| DATA WIDTH OF PLANE 1 | 5 | 6 |
| DATA POSITION OF PLANE 2 | | |
| DATA WIDTH OF PLANE 2 | | |
| DATA POSITION OF PLANE 3 | | |
| DATA WIDTH OF PLANE 3 | | |

(Leftmost label: FORM 3)

FIG. 22A-III

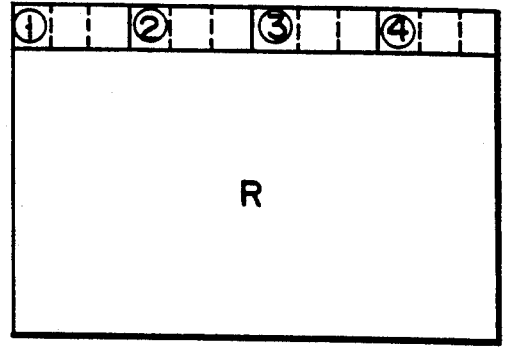
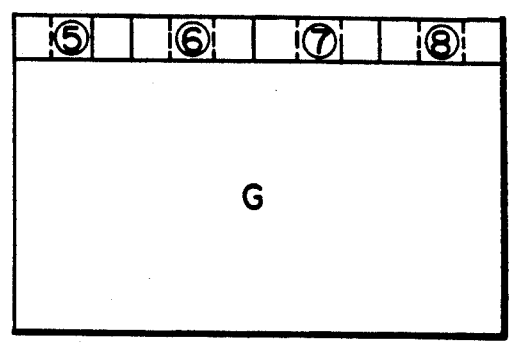
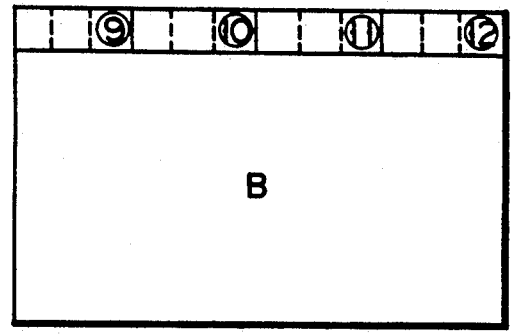
FIG. 24

COLOR IMAGE INFORMATION PROCESSING APPARATUS CAPABLE OF HIGH-SPEED PROCESSING IMAGE INFORMATION IN DIFFERENT FORM

BACKGROUND OF THE INVENTION

1. Field of the Invention

The present invention relates to an image information processing apparatus for transferring, e.g., color image information between different types of processing means and processing the information.

2. Description of the Related Art

Recently, an image information processing apparatus such as an electronic filing apparatus has been put into practical use. In this apparatus, image information such as documents produced in large quantities are read by a two-dimensional scanning unit (scanner) upon optical, two-dimensional scanning, and the read image information is stored in an optical disk. Arbitrary image information stored in the optical disk is retrieved and read out. The readout image information is then output from an output unit, e.g., a CRT display unit or a printer, to be visualized.

Expression schemes for color image information employed by such apparatuses are classified into various types according to storage forms. There are, for example, a plane independent scheme shown in FIG. 1A and a packed pixel scheme shown in FIG. 1B. In the plane independent scheme, R, G, and B components of each pixel constituting image information are respectively stored in storage means 1, 2, and 3 in units of R, G, and B planes as pixel color components, i.e., in units of colors. In the packed pixel scheme, R, G and B planes are sequentially stored in units of pixels. However, in either the plane independent scheme o the packed pixel scheme, image information varies in form, e.g., the data width and number of constituent bits of each pixel and plane to be stored in a storage means.

In the conventional apparatuses, therefore, when image information is to be processed (transferred) between a plurality of processing means, e.g., a scanner, a memory, and a printer, which process image information in different forms, the form of the image information is changed to conform to the form of each means upon arithmetic processing by a general CPU or the like.

For this reason, a long processing time is required to transfer image information between processing means which process image information in different forms, thus inevitably imposing limitations on the types of forms of image information to be processed in one apparatus. Moreover, transfer of image information between arbitrary units which process image information in different forms is inefficient and hence cannot be practically performed.

SUMMARY OF THE INVENTION

The present invention has been made to solve the above drawbacks that a long processing time is required to transfer image information between processing means having different image information forms, limitations are inevitably imposed on the types of forms which can be processed in one apparatus, and transfer of image information between arbitrary units having different image information forms is inefficient and cannot be practically performed, and it is an object of the present invention to provide an image information processing apparatus which can perform high-speed transfer processing between arbitrary processing means or units having different image information forms, and can realize a flexible system.

According to an aspect of the present invention, there is provided an image information processing apparatus comprising first means for storing transfer source form information and outputting them; second means for storing transfer destination from information and outputting them; means for extracting pixel and plane data designated by the first storing means form transfer source data inputted; means for converting a width of a plane data received from the extracting means when plane data received from the first storing means is different from that received from the second storing means; and means for reformatting the transfer source data extracted by the extracting mean into a form designated by the second storing means and outputting the form as transfer destination data.

According to another aspect of the present invention, there is provided an image information processing apparatus comprising a plurality of means for processing image information and having different image information forms such as pixel width and plane width, means for transferring image information between the processing means, means for detecting an image information form such as a pixel width and plane width in processing means at a transfer source and an image information form such as a pixel width and plane width in processing means at a transfer destination when image information is transferred between the processing means by the transfer means, and means for changing the image information form such as the pixel width and plane width from the processing means at the transfer source into the image information form such as the pixel width and plane width of the processing means at the transfer destination in accordance with the image information forms of the transfer source and the transfer destination, detected by the form detecting means, when the transfer means transfers the image information between the processing means having the different image information forms.

In the present invention, a plurality of processing means which process image information and have different image information forms such as a pixel width and plane width are arranged. A transfer means transfers image information between the processing means. When image information is transferred between the processing means by the transfer means, form detecting means detects an image information form such as a pixel width and plane width in processing means at a transfer source and an image information form such as a pixel width and plane width in processing means at a transfer destination. When the transfer means transfers the image information between the processing means having the different image information forms, changing means changes the image information form such as a pixel width and plane width from the processing means at the transfer source into the image information form such as a pixel width and plane width of the processing means at the transfer destination in accordance with the image information forms of the transfer source and the transfer destination, detected by the form detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram showing the arrangement of a control circuit in an image information processing apparatus according to an embodiment of the present invention;

FIG. 3 is a view showing a general form of a data format for one transfer unit of color image information;

FIG. 4 is a flow chart for explaining transfer processing of image information;

FIG. 9 is a flow chart for explaining selection processing of form information;

FIG. 10 is a block diagram showing the internal arrangement of a reformatting means;

FIGS. 14A, 15A, and 16A are views respectively showing arrangements of plane data width converting means;

FIGS. 14B, 14C, 15B and 16B are views for explaining shift states in the plane data width converting means;

FIGS. 18C, 19B, 19C, 20B, 20C, 21B, 21C, 22B, 22C, 23, and 24 are views for explaining image information before and after reformation.

DETAILED DESCRIPTION ON THE PREFERRED EMBODIMENTS

Figure 1A:
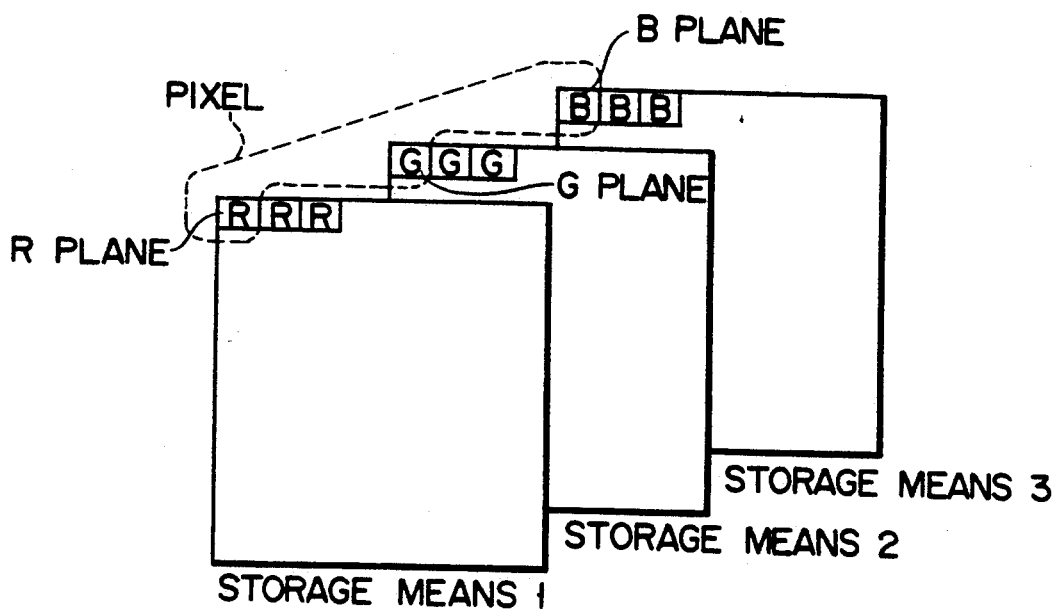
FIG. 1A is a view showing the storage form of image information in the plane independent scheme.
Figure 1B:
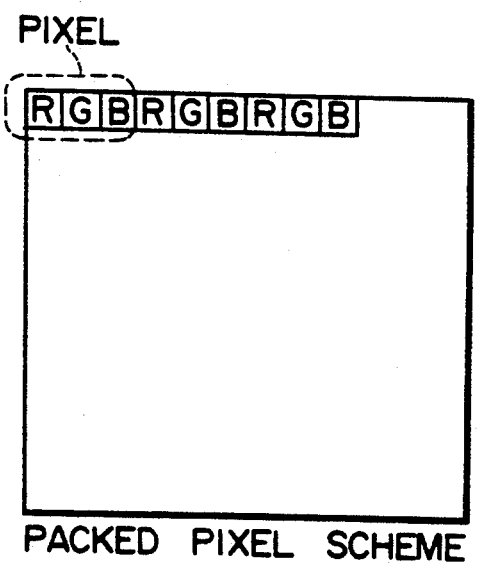
FIG. 1B is a view showing the storage form of image information in the packed pixel scheme.

An image information processing apparatus according to an embodiment of the present invention will be described below with reference to the accompanying drawings.

FIG. 2 shows an electronic filing apparatus as the image processing apparatus of the present invention. The electronic filing apparatus comprises a central processing unit (CPU) 11 for controlling the overall apparatus, a program memory 12 for storing control information prescribing processing performed by the CPU 11, a reformatting means 13 for converting the format (form) of image information to be transferred, an image input means 14 serving as a scanner interface for interfacing with a scanner unit 17, an image output means 15 serving as a printer interface for interfacing with a printer unit 18, and an image storage means 16. In practice, the image information storage means 16 may be constituted by either a general memory device or a large-capacity recording medium such as an optical disk unit.

FIG. 3 shows a general form of a data format for one transfer unit of color image information. Data of one transfer unit is constituted by a combination of a pixel count (n), a plane data count (m), and a plane data width (l). One transfer unit is constituted by information of a plurality of pixels. Furthermore, information of one pixel is constituted by information of a plurality of planes. Although FIG. 3 shows a general form, in practice, the form of one transfer unit varies depending on a processing means or a unit. For example, one transfer unit may be constituted by only one pixel or only one plane. That is, the form of a transfer unit depends on the hardware of each unit and greatly varies. As plane information, R (red) information, G (green) information, and B (blue) information, or Y (yellow) information, M (magenta) information, C (cyan) information, and B (black) information are prepared. The respective planes may be constituted by different numbers of bits. For example, if the pixel data width is set to be 8 bits, bit assignment is generally performed such that 3 bits are assigned to R (red) information; 3 bits, to G (green) information; and 2 bits, to B (blue) information.

The reformatting means 13 serves to perform high-speed conversion processing of a transfer form in a case wherein image information is to be transferred between processing means or units to which image information must be transferred in different forms.

As indicated by the flow chart shown in FIG. 4, in transfer processing of image information, if the form (SRC) (step ST1) of image information of a transfer source coincides with the form (DST) (step ST2) of image information of a transfer destination (step ST3), the CPU 11 directly transfers the image information from the transfer source to the transfer destination (step ST5). If the forms of image information differ from each other (step ST3), the CPU 11 transfers the image information from the transfer source to the transfer destination through the reformatting means 13 (after the execution of development and reformation) (step ST4).

Figure 5:
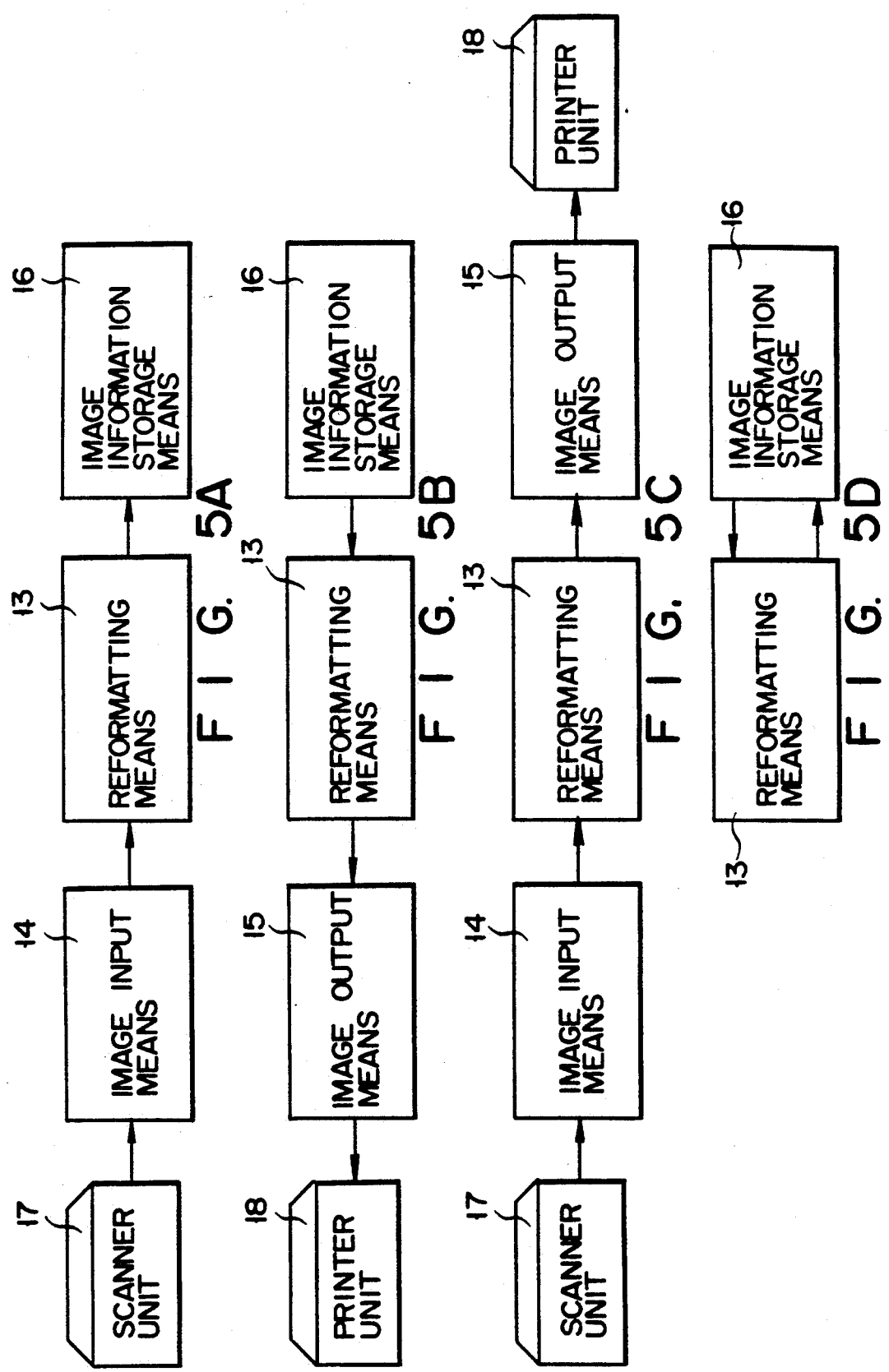
FIGS. 5A to 5D are block diagrams showing transfer states accompanying conversion of an image information form between the respective means.

FIGS. 5A to 5D respectively show transfer states accompanying conversion of the form of image information between the respective means constituting this embodiment. For example, FIG. 5A shows a case wherein image information read by the scanner unit 17 is transferred to the image information storage means 16 through the image input means 14 and the reformatting means 13. FIG. 5B shows a case wherein image information stored in the image information storage means 16 is transferred to the printer unit 18 through the reformatting means 13 and the image output means 15. FIG. 5C shows a case wherein image information read by the scanner unit 17 is stored in the image information storage means 16 through the image input means 14 and the reformatting means 13, and the image information stored in the image information storage means 16 is further transferred to the printer unit 18 through the image output means 15. FIG. 5D shows a case wherein image information stored in the image information means 16 is transferred to the image information storage means 16 through the reformatting means 13.

Figure 6:
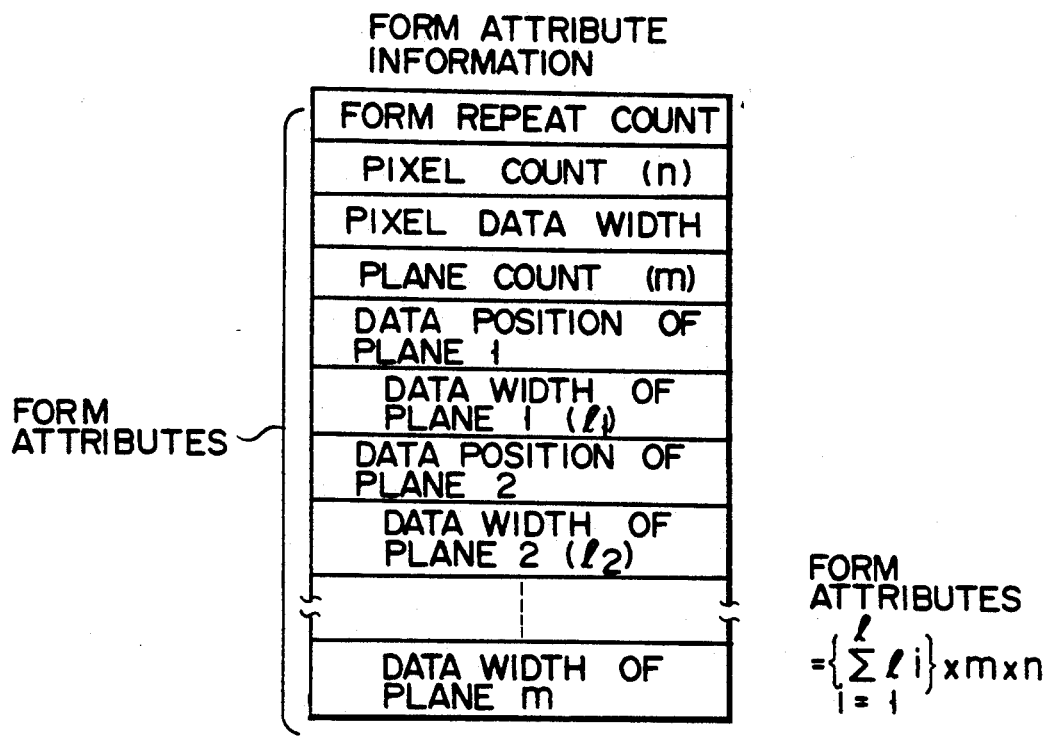
FIG. 6 is a view showing the format of form attribute information defining a transfer image form.
Figure 7:
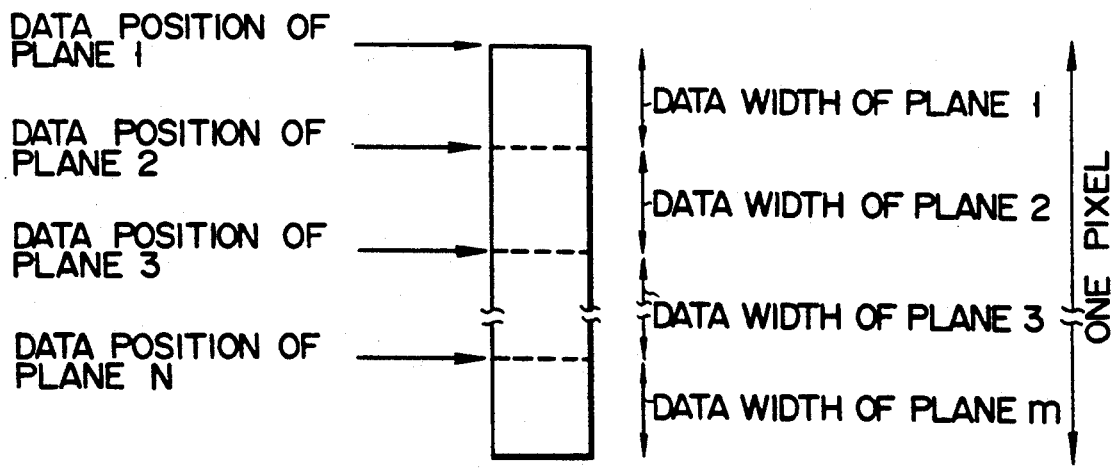
FIG. 7 is a view showing the bit position and bit width of each plane information included in one pixel.

Form attribute information for defining the form of image information to be transferred, which is used by the reformatting means 13, is constituted by a form repeat count, a pixel count (n), a pixel data width, a plane count (m), the data positions of planes 1 to N, and the data widths (l) of the planes 1 to N, as shown in FIG. 6. A form repeat count defines the number of times of transfer in which "form attribute" defined by a pixel count (n) and the like defined below is repeated. For example, if the form repeat count is "3", it means that the same form attribute is continuously repeated three times. A pixel count (n) is the number of pixels included in one transfer unit. A pixel data width is the number of data bits constituting one pixel. A plane count (m) is the number of image planes for expanding one pixel. The data positions and data widths ($l_1, l_2, \ldots, l_n$) of the planes 1 to N respectively represent the bit positions and bit widths of the respective plane information included in one pixel information, which are expressed by relative positions within one pixel, as shown in FIG. 7.

When transfer of image information is to be performed, the form attribute information of a transfer source and that of a transfer destination are both stored in the internal memory 11a of the CPU 11. The CPU 11 determines whether the form attribute information of the transfer source and that of the transfer destination, stored in the internal memory 11a, coincide with each other. The reformatting means 13 performs conversion processing of the image information in accordance with the determination result, and transfers the resulting information.

Figure 8:
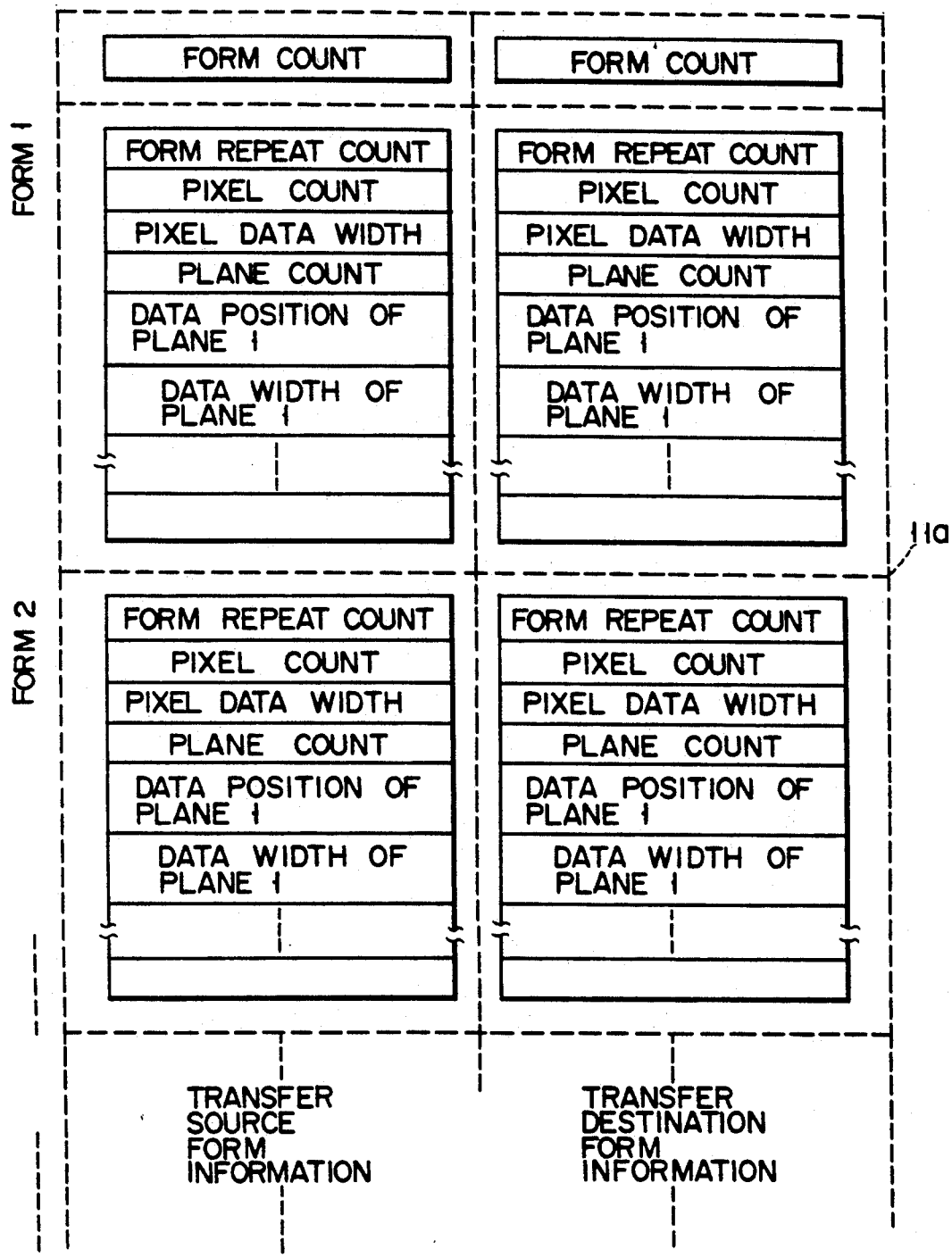
FIG. 8 is a view for explaining transfer source form attribute information and transfer destination form attribute information.

As shown in FIG. 8, form attribute information stored in the internal memory 11a has attribute information "form count" for defining the number of forms, such as "form 1", "form 2", . . ., for a transfer source and a transfer destination each, thus allowing a plurality of types of form attribute information, such as the one shown in FIG. 6, to be defined.

As indicated by the flow chart shown in FIG. 9, of form attribute information stored in the internal memory 11a, the first form information, i.e., "form 1", is selected (step ST11). Transfer processing is continuously repeated the number of times corresponding to a form repeat count defined in this form information (step ST12). If the number of times of transfer reaches the form repeat count (step ST13), the form attribute information is updated (step ST14). If update processing is performed the number of times corresponding to "form count" (step ST15), the first form attribute information is selected again (step ST11). Subsequently, transfer is performed while update of form attribute information is sequentially repeated.

The internal arrangement of the reformatting means 13 will be described below with reference to the block diagram of FIG. 10. The reformatting means 13 comprises a plane data extracting means 31, a transfer source form information storage control means 32, a transfer data reformatting means 33, a transfer destination form information storage control means 34, and a plane data width converting means 35. In the reformatting means 13, image processing is basically performed such that image information of a transfer source (transfer source data) is decomposed into pixels and planes in the input stage, and is reformatted to conform to the form of the transfer destination in the output stage. The plane data extracting means 31 extracts pixel and plane information designated by the transfer source form information storage control means 32. The transfer data reformatting means 33 reformats the transfer source data extracted by the plane data extracting means 31 into a form designated by the transfer destination form information storage control means 34, and outputs the resulting transfer destination data. The plane data width converting means 35 performs conversion processing when the bit count of the plane data of the transfer source is different from that of the transfer destination. The form information shown in FIG. 8 is stored in the transfer source form information storage control means 32 and the transfer destination form information storage control means 34. In addition, the reformatting means 13 includes a control means for executing the above-described processing in accordance with the form information.

Figure 11:
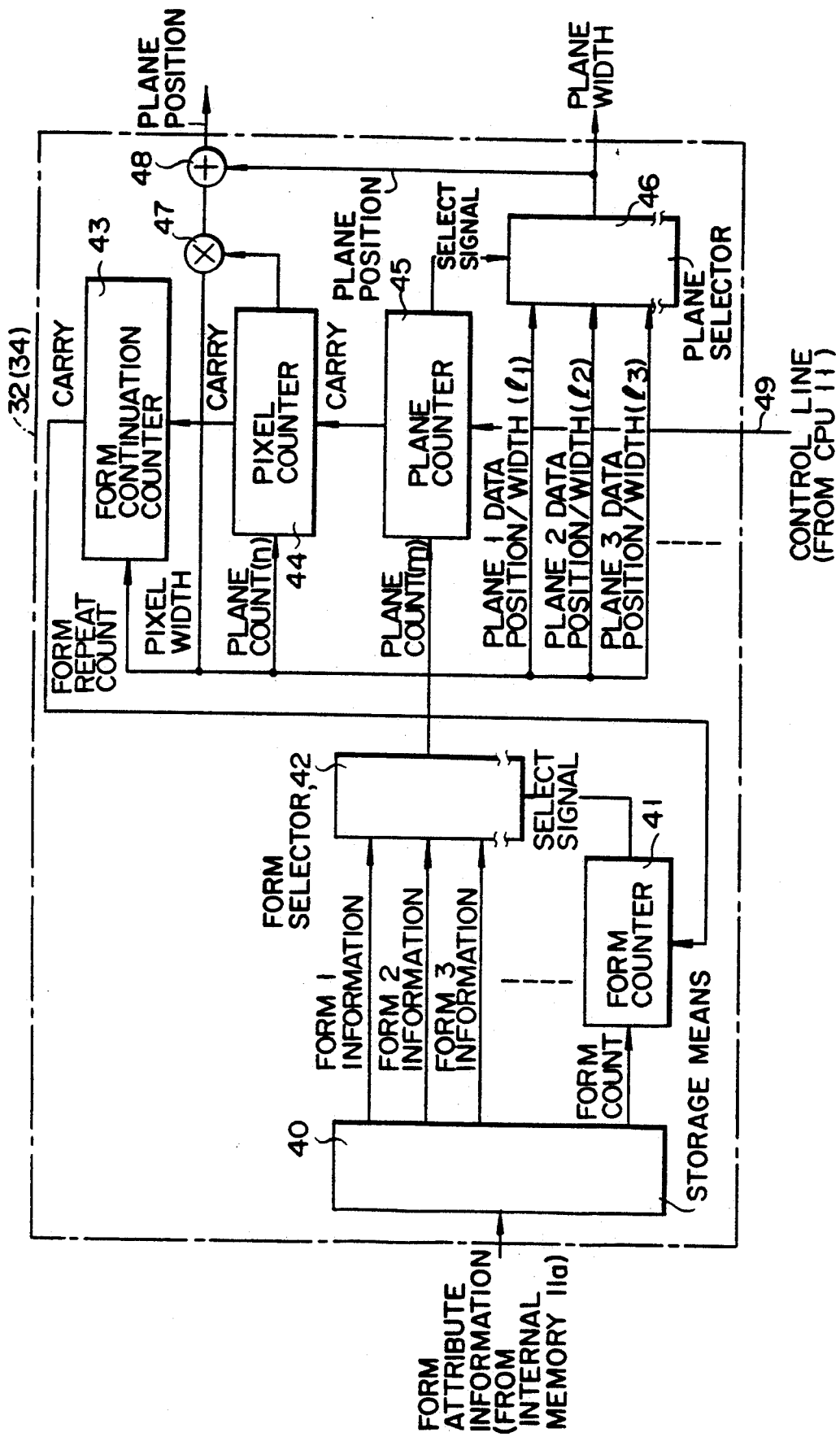
FIG. 11 is a block diagram showing the internal arrangement of a transfer source form information storage control means.

The internal arrangement of the transfer source form information storage control means 32 will be described below with reference to the block diagram of FIG. 11. The transfer source form information storage control means 32 comprises a storage means 40, a form counter 41, a form selector 42, a form repeat counter 43, a pixel counter 44, a plane counter 45, a plane selector 46, a multiplier 47, and an adder 48. The storage means 40 serves to store form attribute information of a transfer source, supplied from the internal memory 11a. The form counter 41 is a counter having a base defined by "form count" of form attribute information. When the form count is 2, the counter 41 serves as a binary counter. When the form count is 3, the counter 41 is serves as a ternary counter. The form repeat counter 43, the pixel counter 44, and the plane counter 45 all operate as preset counters. The form selector 42 is a selector for selecting one of form attribute information in accordance with the count value of the form counter 41. Of the form attribute information selected by the form selector 42, a form repeat count, a pixel count, a pixel width, and a plane count are respectively set in the form repeat counter 43, the pixel counter 44, the multiplier 47, and the plane counter 45. Each plane information of the form attribute information selected by the form selector 42 is output from the plane selector 46. A set of plane information supplied from the form selector 42 is selected and output to the plane selector 46 in accordance with the count value of the plane counter 45.

With the above-described arrangement, every time plane information is extracted, a control signal (corresponding to a data transfer clock) of a control line 49 is activated by the CPU 11 to sequentially update the count value of each of the counters 45, 44, and 43. The counter 45, 44, and 43 are all initially set to be "0". In this state, "form 1" is selected first by the form selector 42. Of this form attribute information, the plane information of plane 1 of pixel 1 is selected and input to the plane counter 45. Subsequently, when the control signal of the control line 49 is activated, the count value of the plane counter 45 is set to be "1", and the plane information of plane 2 of "form 1" is selected. When a predetermined number of planes are counted, the pixel counter 44 is updated, and the plane information of pixel 2 is selected. In this case, each pixel has the same plane arrangement, and the same plane width is repeatedly used for the respective pixels. Therefore, it is only required that the plane position be changed by the pixel width. For this reason, the pixel width and the count value of the pixel counter 44 are multiplied with each other by the multiplier 47, and the obtained product and the relative position of the plane selected by the plane selector 46 are added together by the adder 48, thus calculating the position of the designated plane in the transfer data. This operation is repeated by the number of times corresponding to the pixel count, and counting of the form repeat counter 43 is performed by the number of times corresponding to the repeat count. Thereafter, the form counter 41 is updated to select the next form attribute information. The same processing is subsequently performed with respect to "form 2", "form 3", . . ..

The transfer destination form information storage control means 34 has the same arrangement as that of the transfer source form information storage control means 32. However, the storage means 40 serves to store the form attribute information of a transfer destination.

Figure 12:
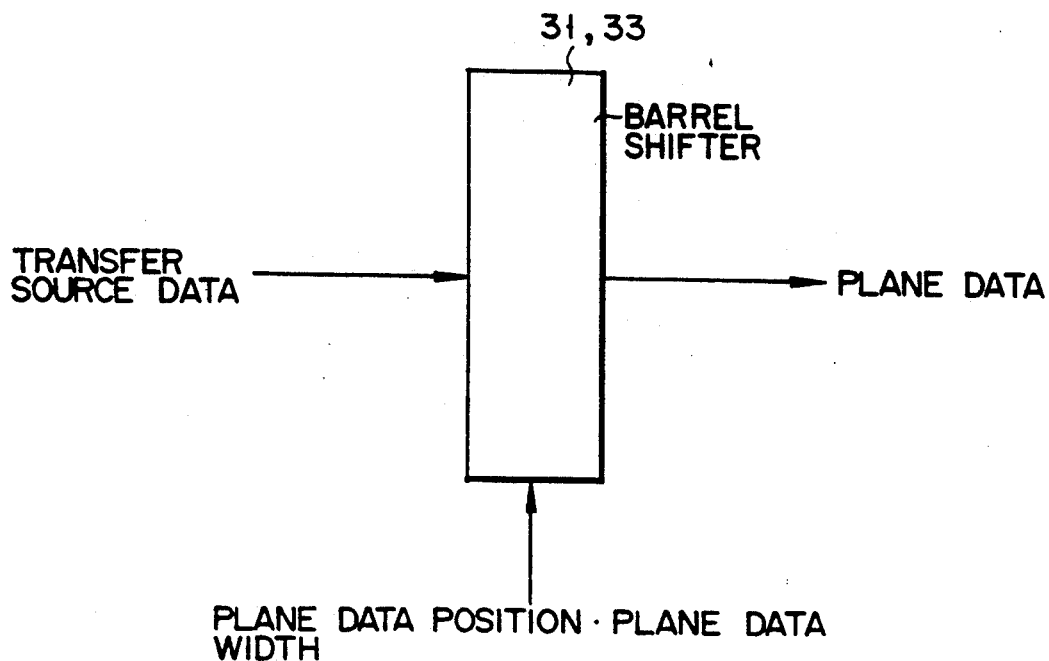
FIG. 12 is a view showing an arrangement of a plane data extracting means and a transfer data reformatting means.
Figure 13:
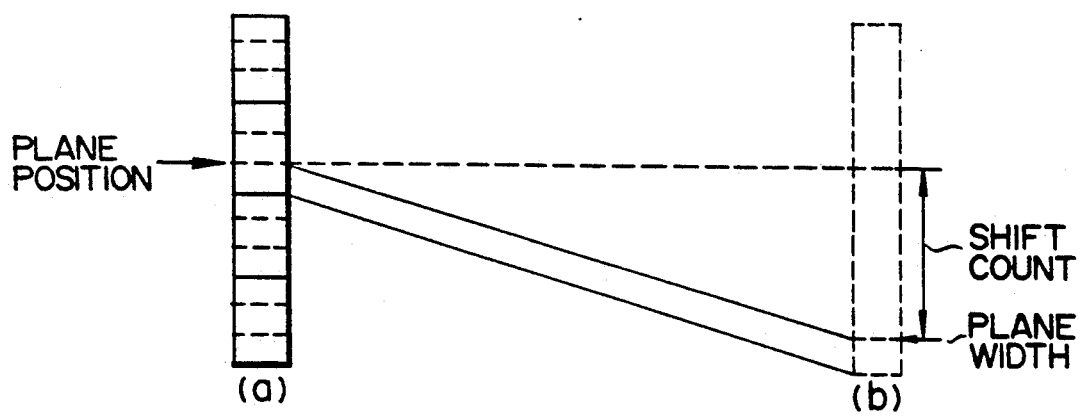
FIG. 13 is a view for explaining a shift state in a barrel shifter.

As shown in FIG. 10, plane position information and plane width information output from the transfer source form information storage control means 32 are supplied to the plane data extracting means 31 and the plane data width converting means 35. Plane position information and plane width information output from the transfer destination form information storage control means 34 are supplied to the transfer data reformatting means 33 and the plane data width converting means 35. The plane data extracting means 31 and the transfer data reformatting means 33 are constituted by, e.g., a barrel shifter shown in FIG. 12. With this arrangement, a shift operation corresponding to the difference between a plane position and a plane width is performed, as shown in FIG. 13. The difference between the plane data extracting means 31 and the transfer data reformatting means 33 indicates the direction of a shift operation. A shift operation from a state (a) in FIG. 13 to a state (b) in FIG. 13 is performed by the transfer source form information storage control means 32, whereas a reverse shift operation is performed by the transfer destination form information storage control means 34.

Figure 16A:
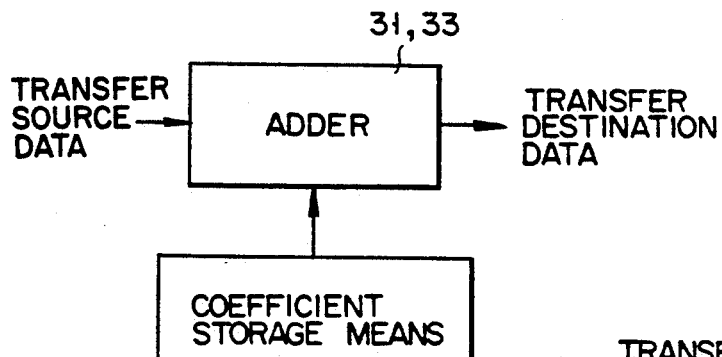
Figure 16B:
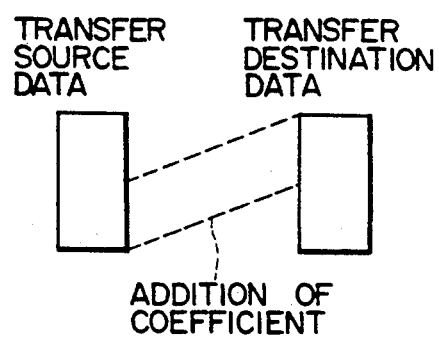
Figure 17A:
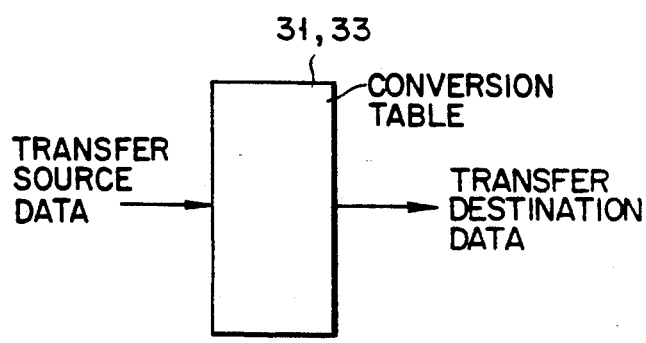
FIG. 17A is a view showing an arrangement of a plane data width converting means.
Figure 17B:
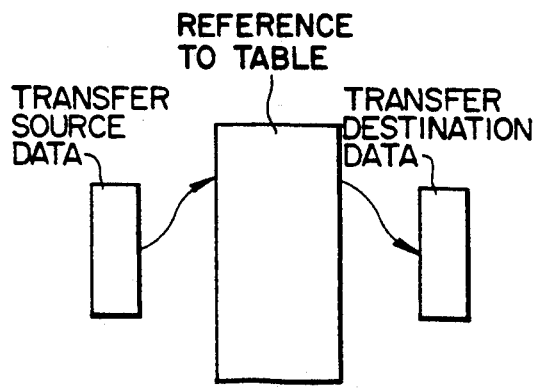
FIG. 17B is a view showing an example of processing in the plane data width converting means, FIGS. 18A, 19A, 20A-I and II, 21A-I, II and III, and 22A-I, II and III are views for explaining transfer source form attribute information and transfer destination form attribute information.

The plane data width converting means 35 in FIG. 10 serves to adjust a plane data width (l). The plane data width converting means 35 is constituted by, e.g., a shifter as shown in FIG. 14A, a multiplier as shown in FIG. 15A, an adder as shown in FIG. 16A, or a conversion table as shown in FIG. 17A. The means 35 is designed to perform high-speed conversion. FIG. 14A shows a scheme in which a shifter is simply closed, and transfer source data is properly shifted to conform to transfer destination data. As shown in FIGS. 14B and 14C, whether the upper or lower portion of transfer source data is validated is arbitrarily designated by designating the direction of a shift operation. FIGS. 15A and 15B show a scheme in which transfer destination data is multiplied by a coefficient to be matched with transfer source data. For example, when 4-bit data is to be simply expanded to 5-bit data, the 4-bit data is multiplied by 31/15. FIGS. 16A and 16B show a scheme in which a coefficient is added to transfer destination data. FIGS. 17A and 17B show a scheme in which transfer destination data is obtained by referring to a conversion table on the basis of transfer source data. This scheme is effective when the bit width is small.

Processing performed by the reformatting means 13 shown in FIG. 10 will be described below with reference to FIGS. 18A to 24.

Transfer processing in the state shown in FIG. 18A will be described first, in which one type of form attribute information is used, one transfer destination is present, and no plane definition is given. In this case, since only one type of form is set, an arbitrary form repeat count can be set. As a result, transfer source image data shown in FIG. 18B is converted into image data shown in FIG. 18C to be output to the transfer destination. More specifically, the transfer source data and the transfer destination data are the same in pixel data width, plane count, the data position of plane 1, and the data width of plane 1, but are different in that the pixel count of the transfer source data is "4" and that of the transfer destination data is "1". Therefore, data is transferred from the transfer source in units of four pixels, whereas data is transferred to the transfer destination in units of pixels.

Transfer processing in the state shown in FIG. 19A will be described below, in which one type of form attribute information is used, one transfer destination is present, and the plane data included in one pixel is transferred in units of planes. In this case, since only one type of form is set, an arbitrary form repeat count can be set. In this state, 1-pixel image data of the transfer source data, shown in FIG. 19B, is converted into image data in units of planes shown in FIG. 19B to be transferred to the transfer destination. More specifically, the pixel data width is changed from "11" to "4" between the transfer source and the transfer destination; and the plane count, from "3" to "1". In the transfer source, the data positions of planes 1, 2, and 3 are "0", "4", and "7", respectively, and the data widths of planes 1, 2, and 3 are "4", "3", and "4", respectively. In the transfer destination, however, the data position of plane 1 is "0", and the data width of plane 1 is "4". Therefore, the data (11 bits) of the three planes of one pixel is collectively transferred from the transfer source, whereas the one-pixel data is transferred to the transfer destination in units of plane data (4 bits).

Figure 23:
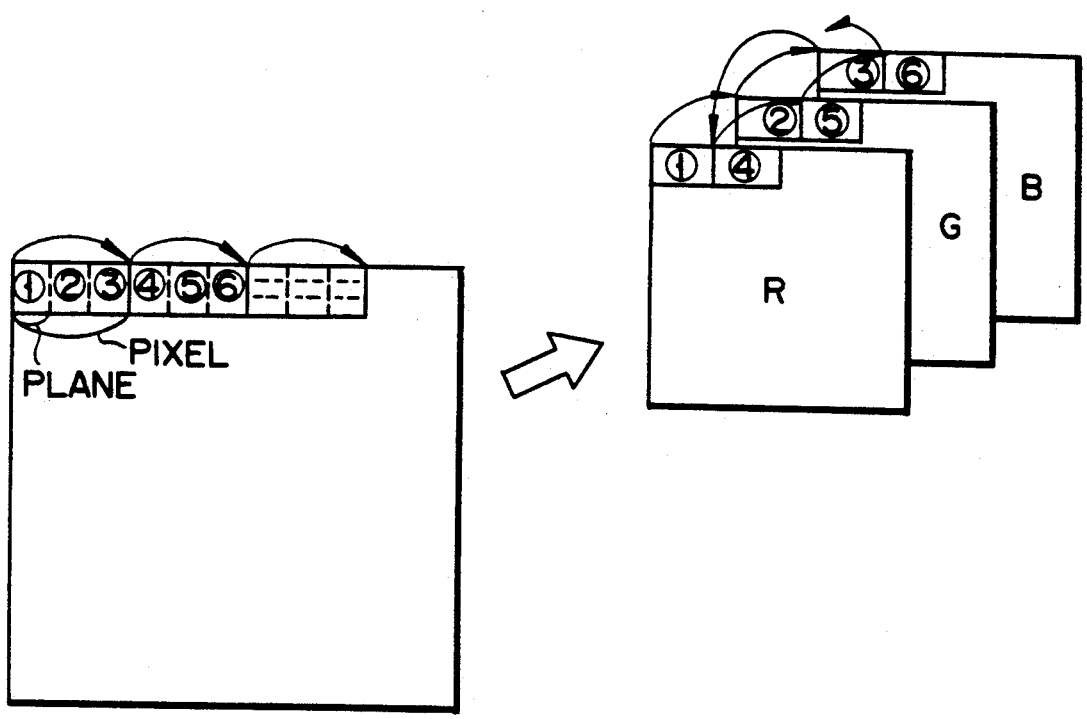

As a result, for example, as shown in FIG. 23, the plane data of one-page image information, each pixel of which is constituted by 3 planes, are respectively transferred to three memories corresponding to the colors of the three types of planes and are stored therein. More specifically, the image information of the three types of planes, i.e., R (red), G (green), and B (blue) planes constituting each pixel transferred from the transfer destination source, are respectively transferred to different memories, respectively prepared for R (red), G (green), and B (blue), to be stored therein.

Figures 20B, 20C:
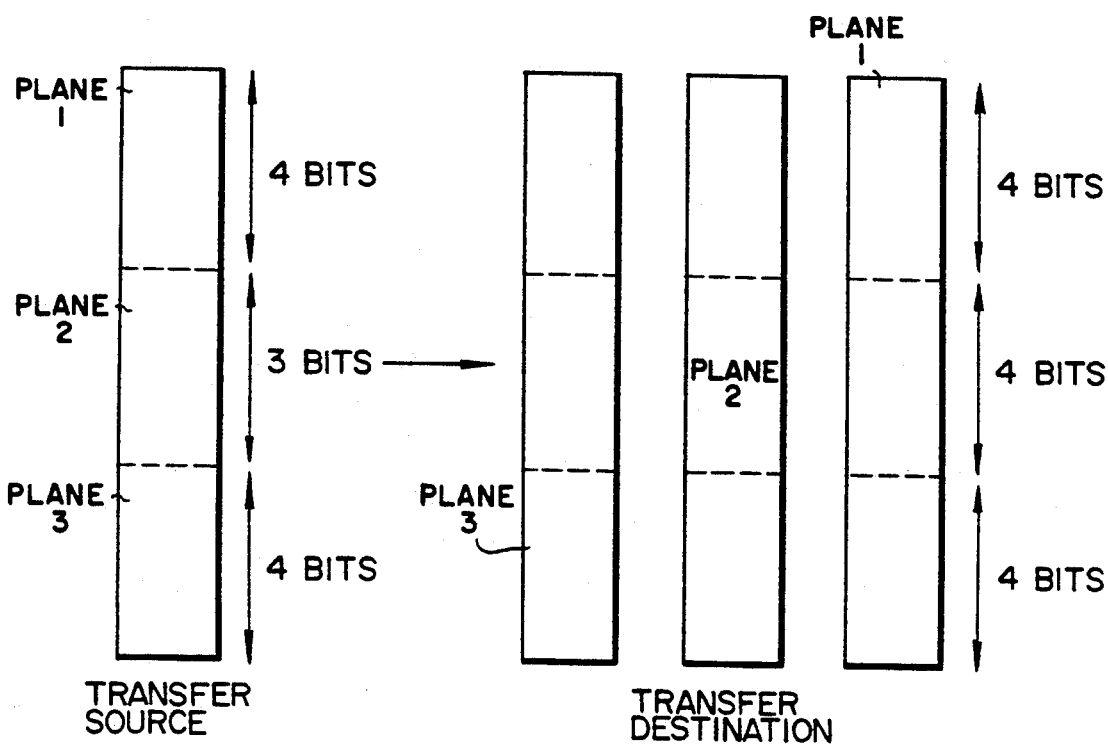

Transfer processing in the state shown in FIG. 20A will be described below, in which there are three types of form attribute information, one transfer source, and three transfer destinations, and the plane data included in one pixel are transferred in units of planes while each plane data position is defined. In this case, since only one type of form is set, an arbitrary form repeat count can be set. The form count of each transfer destination is set to be "1". In this state, 1-pixel image data of the transfer source, shown in FIG. 20B, is converted into image data in units of planes, shown in FIG. 20C, with the plane data positions respectively defined. The resulting data are then output to each transfer destination. More specifically, the pixel data width is changed from "11" to "12" between the destination source and each transfer destination; and the plane count, from "3" to "1". In the transfer source, the data positions of planes 1, 2, and 3 are "0", "4", and "7", respectively, and the data widths of planes 1, 2, and 3 are "4", "3", and "4", respectively. In the first transfer destination, however, the data position and data width of plane 1 are "0" and "4", respectively. In the second transfer destination, the data position and data width of plane 1 are "4" and "4", respectively. In the third transfer destination, the data position and data width of plane 1 are "8" and "4", respectively. Therefore, data (11 bits), each pixel of which consists of three planes, is collectively transferred from the transfer source, whereas the data (4 bits) of each plane of one pixel is transferred, as 12-bit data having actual data assigned to one of three different positions, to each transfer destination.

Transfer processing in the state shown in FIG. 21A will be described below, in which there are three types of form attribute information, one transfer source, and three transfer destinations, and data is transferred in units of planes while each plane data position is defined. In this case, since only one type of form is set, an arbitrary form repeat count can be set. Since the form count of each transfer destination is updated every time form attribute information corresponding to one line is transferred, the repeat count is set to coincide with a one-line transfer count. In this state, image data transferred from the transfer source in units of planes (4 bits), shown in FIG. 21B, are converted into image data in units of planes (12 bits), shown in FIG. 21C, with the plane data positions respectively defined. The resulting data are then transferred to each transfer destination. More specifically, the pixel data width is changed from "4" to "12" between the transfer source and each transfer destination, and the plane count remains the same. In the transfer source, the data position and data width of plane 1 are "0" and "4", respectively. In the first transfer destination, the data position and data width of plane 1 are "0" and "4", respectively. In the second transfer destination, the data position and data width of plane 1 are "4" and "4", respectively. In the third transfer destination, the data position and data width of plane 1 are "8" and "4", respectively. Therefore, the data (4 bits) of one plane is transferred from the transfer source, whereas the data (4 bits) of each plane of one pixel is transferred, as 12-bit data having actual data assigned to one of three different positions, to each transfer destination.

In this case, plane data from the transfer source are transferred in units of scanning lines of an image. Since information to each transfer destination is updated every time a transfer operation corresponding to one line is performed, the repeat count is set to coincide with a one-line transfer count. In contrast to this, since the same form information is used for the transfer source, the form count is set to be "1" to perform transfer processing with the same attribute information.

As a result, for example, as shown in FIG. 24, R (red) plane data, G (green) plane data, and B (blue) plane data can be respectively transferred to three memories respectively prepared for R (red), G (green), and B (blue), in units of lines, to be stored therein. More specifically, when the R (red) plane data of one line are sequentially supplied from the transfer source to the reformatting means 13 in units of planes, the data width of each plane data is increased to 12 bits, as shown in FIG. 21A, and the data are sequentially stored in the memory for R (red). Similarly, when the G (green) plane data of one line are sequentially supplied from the transfer source to the reformatting means 13 in units of planes, the data width of each plane data is increased to 12 bits, as shown in FIG. 21A, and the data are sequentially stored in the memory for G (green). When the B (blue) plane data of one line are sequentially supplied from the transfer source to the reformatting means 13 in units of planes, the data width of each plane data is increased to 12 bits, as shown in FIG. 21A, and the data are sequentially stored in the memory for B (blue).

Figures 21B, 21C:
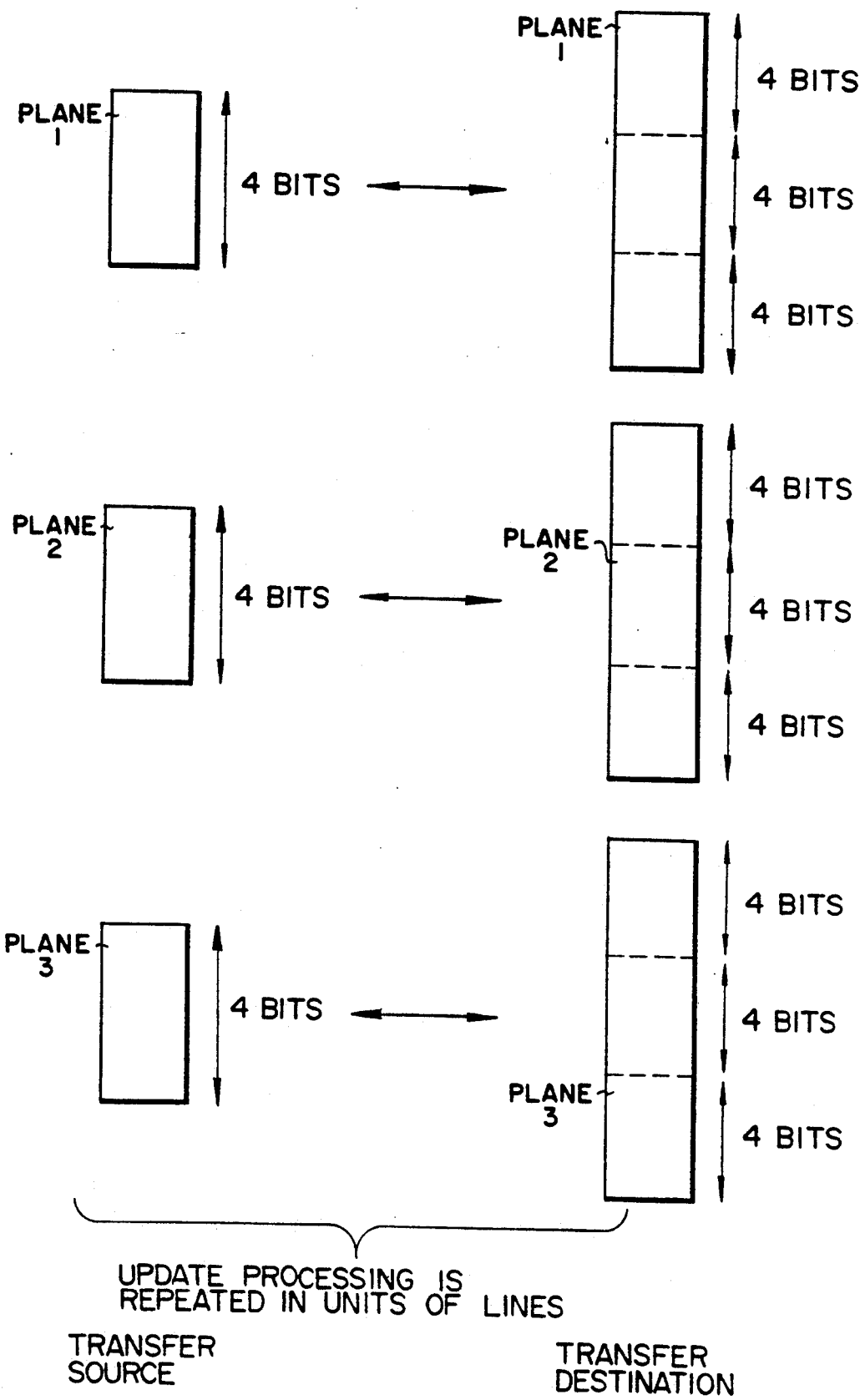
Figures 22B, 22C:
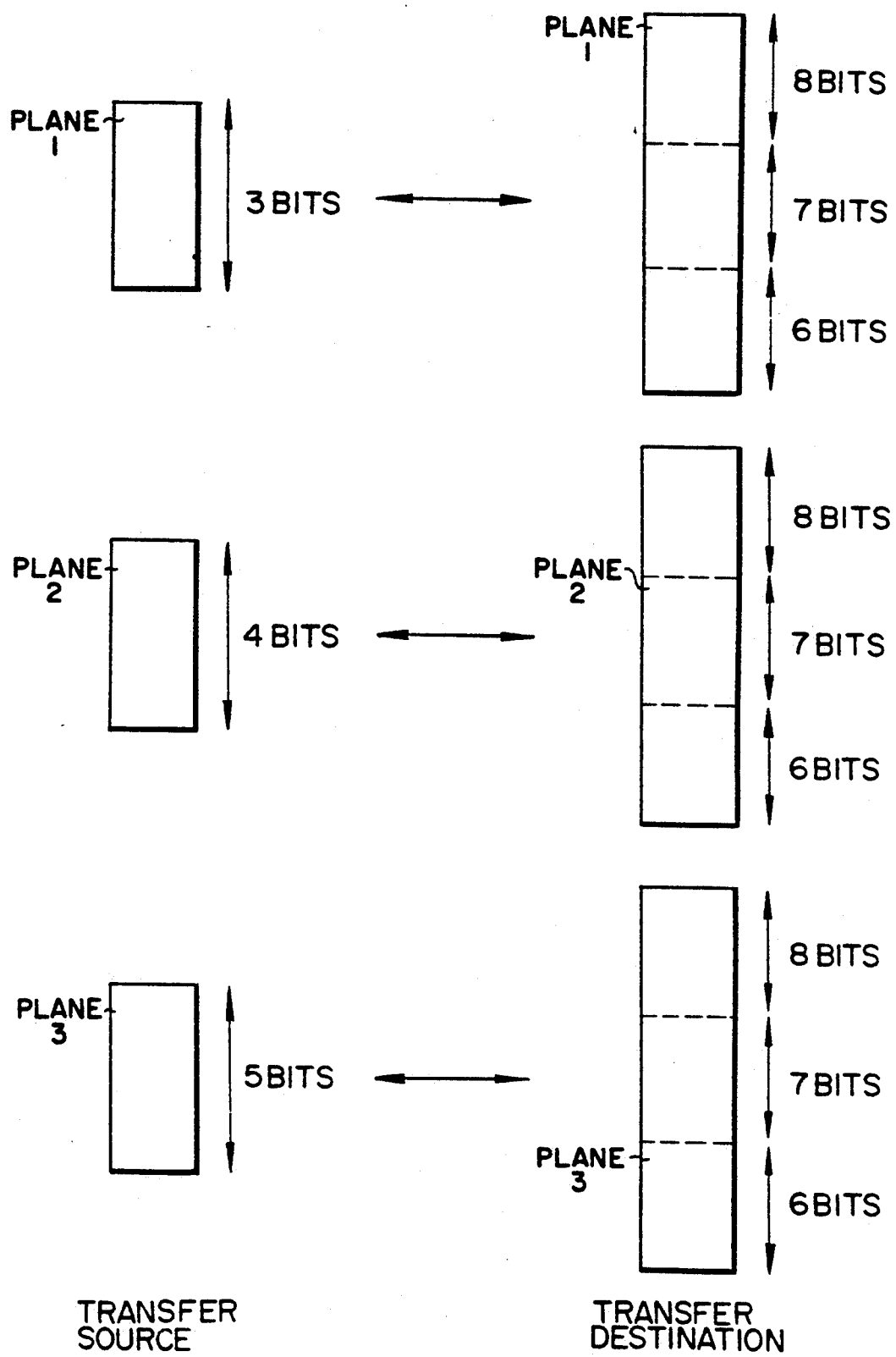

FIGS. 22A, 22B, and 22C show a case wherein a condition that the information form of a transfer source is updated for every line is added to the conditions shown in FIGS. 21A, 21B, and 21C.

In the above-described case, if the form information of the transfer source is constituted by a reverse combination of information to that constituting the form information of the transfer destination, the transfer source and the transfer destination may simply exchange the form attribute information.

An operation in such an arrangement will be described next. Assume that processing for storing image information, read by the scanner unit 17, in the image information storage means 16 is selected by a designating means such as a keyboard. In this case, the CPU 11 stores form attribute information, set in the scanner unit 17, in the internal memory 11a, and also stores form attribute information, set in the image information storage means 16, in the internal memory 11a. With this operation, the form attribute information in the scanner unit 17 is stored, as transfer source information, in the internal memory 11a, while the form attribute information in the image information storage means 16 is stored, as transfer destination information, in the internal memory 11a (see FIG. 8). The CPU 11 checks whether the form attribute information of the transfer source coincides with that of the transfer destination. If they perfectly coincide with each other, the image information read by the scanner unit 17 is transferred to the image information storage means 16 through the image input means 14 and the reformatting means 13. In this manner, the image information read by the scanner unit 17 is stored in the image information storage means 16.

If the form attribute information of the transfer source does not coincide with that of the transfer destination, the CPU 11 outputs the form attribute information of the transfer source and that of the transfer destination to the reformatting means 13, and outputs the image information read by the scanner unit 17 to the reformatting means 13 through the image input means 14. Subsequently, the reformatting means 13 converts the image information from the scanner unit 17 as the transfer source into image information conforming to the form attribute information of the transfer destination in accordance with the form attribute information of the transfer source and that of the transfer destination. With this operation, the form of the image information read by the scanner unit 17 is changed by the reformatting means 13, and the resulting information is stored in the image information storage means 16.

In the above-described embodiment, the form attribute information of a transfer destination and that of a transfer source are automatically set when image information is to be transferred. However, the respective contents of form attribute information, such as a repeat count, may be designated through a designating means, e.g., a keyboard, using a display means.

As has been described above, when image information is be transferred between processing means or units having different image information forms, e.g., the pixel width and plane width of image information, the image information is converted by the reformatting means using the form attribute information of a transfer source and that of a transfer destination.

With this operation, a long processing time is not required to transfer image information between arbitrary processing means or units having different image information forms, e.g., the pixel width and plane width of image information, and there is no need to impose limitations on the types of forms which can be processed on one apparatus, thus enabling high-speed processing and realizing a flexible system.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image information processing apparatus comprising:

first means for storing transfer source form information including pixel width information and outputting the transfer source form information, said first storing means including a storage means for storing the transfer source form information, a form counter for counting a form count of the form information supplied from the storage means, a form selector for selecting one of the form information supplied from said storage means in accordance with the count value of said form counter, a form repeat counter for counting a form repeat count supplied from said form selector, a pixel counter for counting a pixel count supplied from said form selector, a plane counter for counting a plane count supplied from said form selector, a plane selector for selecting plane information supplied from said form selector in accordance with an output of said plane counter and for outputting plane width information, a multiplier for multiplying said pixel width information and an output from said pixel counter, and an adder for adding an output of said multiplier and an output of said plane selector and for outputting plane position information;

second means for storing transfer source form information and outputting the transfer source form information, said second storing means including a storage means for storing the transfer destination form information, a form counter for counting a form count of the form information supplied from the storage means, a form selector for selecting one of the form information supplied from said storage means in accordance with the count value of said form counter, a form repeat counter for counting a form repeat count supplied from said form selector, a pixel counter for counting a pixel count supplied from said form selector, a plane counter for counting a plane count supplied from said form selector, a plane selector for selecting plane information supplied from said form selector in accordance with an output of said plane counter and for outputting plane width information, a multiplier for multiplying said pixel width information and an output from said pixel counter, and an adder for adding an output of said multiplier and an output of said plane selector and for outputting plane position information;

means for extracting pixel and plane data designated by said first storing means from transfer source data inputted;

means for converting a width of a plane data received from said extracting means when plane data received from said first storing means is different from that received from said second storing means; and means for reformatting said transfer source data extracted by said extracting means into a form designated by said second storing means and for outputting said form as transfer destination data.

2. An image information process apparatus comprising:

a plurality of means for processing image information and having different image information forms including a pixel width and plane width;

means for transferring image information between said processing means;

means for detecting an image information form including a pixel width and plane width in processing means at a transfer source and an image information form including a pixel width and plane width in processing means at a transfer destination when image information is transferred between said processing means by said transferring means; and means for changing the image information form including the pixel width and plane width from said processing means at the transfer source into the image information form including the pixel width and plane width of the processing means at the transfer destination in accordance with the image information forms of the transfer source and the transfer destination, detected by said form detecting means, when said transferring means transfers the image information between said processing means having the different image information forms.

3. An image information process apparatus comprising:

means for supplying a color image to be processed;

first means for storing transfer source form information defining a pixel number, a pixel width, a color information number and a color information width included in one transfer unit of said color image;

second means for storing transfer destination form information defining a pixel number, a pixel width, a color information number and a color information width included in one transfer unit of said color image;

means for extracting information designated by said first storing means from said color image received from said supplying means;

means for converting said information received from said extracting means into information designated by said second storing means on the basis of said transfer source form information and said transfer destination form information when said transfer source form information received from said first storing means is different from said transfer destination form information received from said second storing means;

means for reformatting said information received from said converting means into said transfer destination form information on the basis of said transfer destination form information stored in said second storing means; and means for outputting said transfer destination form information supplied by said reformatting means as color image.

4. An apparatus according to claim 3, wherein said first storing means comprises:

storage means for storing the transfer source form information;

a form counter for counting a form count defining the number of a form of the form information supplied from the storage means;

a form selector for selecting one of the form information supplied from said storage means in accordance with the count value of said repeat counter;

a form repeat counter for counting a form repeat count defining the number of times of transfer supplied from said form selector;

a pixel counter for counting a pixel count defining the number of pixels included in one transfer unit supplied from said form selector;

a plane counter for counting plane count defining the number of image planes supplied from said form selector;

a plane selector for selecting plane information supplied from said form selector in accordance with an output of said plane counter and for outputting plane width information defining the width of image planes;

a multiplier for multiplying pixel width information defining the width of pixels and an output from said pixel counter; and an adder for adding an output of said multiplier and an output of said plane selector and outputting plane position information.

5. An apparatus according to claim 3, wherein said second storing means comprises:

storage means for storing the transfer destination form information;

a form counter for counting a form count defining the number of a form of the form information supplied from the storage means;

a form selector for selecting one of the form information supplied from said storage means in accordance with the count value of said repeat counter;

a form repeat counter for counting a form repeat count defining the number of times of transfer supplied from said form selector;

a pixel counter for counting a pixel count defining the number of pixels included in one transfer unit supplied from said form selector;

a plane counter for counting a plane count defining the number of image planes supplied from said form selector;

a plane selector for selecting plane information supplied from said form selector in accordance with an output of said plane counter and for outputting plane width information defining the width of image planes;

a multiplier for multiplying pixel width information defining the width of pixels and an output from said pixel counter; and an adder for adding an output of said multiplier and an output of said plane selector and for outputting plane position information.

6. An apparatus according to claim 3, wherein said first storing means comprises:

storage means for storing the transfer source form information;

a form counter for counting a form count defining the number of a form of the form information supplied from the storage means;

a form selector for selecting the form information supplied from said storage means in accordance with the count value of said form counter;

a form repeat counter for counting a form repeat count defining the number of times of transfer supplied from said form selector;

a pixel counter for counting a pixel count defining the number of pixels included in one transfer unit supplied from said form selector;

a plane counter for counting a plane count defining the number of image planes supplied from said form selector;

a plane selector for selecting plane information supplied from said form selector in accordance with an output of said plane counter and for outputting plane width information defining the width of image planes;

a multiplier for multiplying pixel width information defining the width of pixels and an output from said pixel counter; and an adder for adding an output of said multiplier and an output of said plane selector and for outputting plane position information.

7. An apparatus according to claim 3, wherein said first storing means comprises:

a storage means for storing the transfer destination form information;

a form counter for counting a form count defining the number of a form of the form information supplied from the storage means;

a form selector for selecting the form information supplied from said storage means in accordance with the count value of said repeat counter;

a form repeat counter for counting a form repeat count defining the number of times of transfer supplied from said form selector;

a pixel counter for counting a pixel count defining the number of pixels included in one transfer unit supplied from said form selector;

a plane counter for counting a plane count defining the number of image planes supplied from said form selector;

a plane selector for selecting plane information supplied from said form selector in accordance with an output of said plane counter and for outputting plane width information defining the width of image planes;

a multiplier for multiplying said pixel width information defining the width of pixels and an output from said pixel counter; and an adder for adding an output of said multiplier and an output of said plane selector and for outputting plane position information.

* * * * *